(12) United States Patent
Lee et al.

(10) Patent No.: US 11,482,009 B2
(45) Date of Patent: Oct. 25, 2022

(54) METHOD AND SYSTEM FOR GENERATING DEPTH INFORMATION OF STREET VIEW IMAGE USING 2D MAP

(71) Applicant: NAVER LABS CORPORATION, Seongnam-si (KR)

(72) Inventors: Donghwan Lee, Seongnam-si (KR); Deokhwa Kim, Seongnam-si (KR)

(73) Assignee: NAVER LABS CORPORATION, Seongnam-si (KR)

(*) Notice: Subject to any disclaimer, the term of this patent is extended or adjusted under 35 U.S.C. 154(b) by 102 days.

(21) Appl. No.: 16/989,201

(22) Filed: Aug. 10, 2020

(65) Prior Publication Data

US 2021/0049372 A1 Feb. 18, 2021

(30) Foreign Application Priority Data

Aug. 12, 2019 (KR) .......................... 10-2019-0098088

(51) Int. Cl.
*G06V 20/56* (2022.01)
*G06T 15/06* (2011.01)
*G06T 3/00* (2006.01)
*G06T 7/55* (2017.01)
*G06V 10/42* (2022.01)
*G06V 20/64* (2022.01)

(52) U.S. Cl.
CPC .............. *G06V 20/56* (2022.01); *G06T 3/005* (2013.01); *G06T 7/55* (2017.01); *G06T 15/06* (2013.01); *G06V 10/42* (2022.01); *G06V 20/647* (2022.01)

(58) Field of Classification Search
None
See application file for complete search history.

(56) References Cited

U.S. PATENT DOCUMENTS

| 9,404,764 | B2* | 8/2016 | Lynch | G01S 17/86 |
| 2014/0125812 | A1* | 5/2014 | Morin | G06K 9/00664 |
| | | | | 348/169 |
| 2016/0350930 | A1* | 12/2016 | Lin | G06K 9/66 |
| 2018/0108172 | A1* | 4/2018 | Huston | G06Q 50/01 |

FOREIGN PATENT DOCUMENTS

| JP | 2002312778 A | 10/2002 |
| KR | 1020180053094 A | 5/2018 |

(Continued)

OTHER PUBLICATIONS

McCormac et al.; "SemanticFusion: Dense 3D Semantic Mapping with Convolutional Neural Networks"; 2017; 2017 IEEE International Conference on Robotics and Automation; Singapore May 29-Jun. 3, 2017; pp. 4628-4635. (Year: 2017).*

(Continued)

*Primary Examiner* — Peter Hoang
(74) *Attorney, Agent, or Firm* — Greer Burns & Crain Ltd.

(57) ABSTRACT

A method for generating depth information of a street view image using a two-dimensional (2D) image includes calculating distance information of an object on a 2D map using the 2D map corresponding to a street view image; extracting semantic information on the object from the street view image; and generating depth information of the street view image based on the distance information and the semantic information.

20 Claims, 10 Drawing Sheets

(56) References Cited

FOREIGN PATENT DOCUMENTS

KR    1020190076815 A    7/2019
KR    1020190089681 A    7/2019

OTHER PUBLICATIONS

MonkeyProofSolutions; "How to calculate the shortest distance between a point and a line?" Apr. 22, 2016; https://monkeyproofsolutions.nl/wordpress/how-to-calculate-the-shortest-distance-between-a-point-and-a-line/; pp. 1-4 (Year: 2016).*

Sonia Rode; "How to calculate distances between points with the Maps JavaScript API;" Nov. 7, 2019; Google Maps Platform; pp. 1-8; https://cloud.google.com/blog/products/maps-platform/how-calculate-distances-map-maps-javascript-api (Year: 2019).*

Jeong et al.; "Towards a Meaningful 3D Map Using Lidar and a Camera;" Sensors. Aug. 6, 2018; pp. 1-16; (Year: 2018).*

Office action issued by the Korean Patent Office corresponding to Korean patent application No. 10-2019-0098088 dated Aug. 28, 2020.

* cited by examiner

FIG. 5
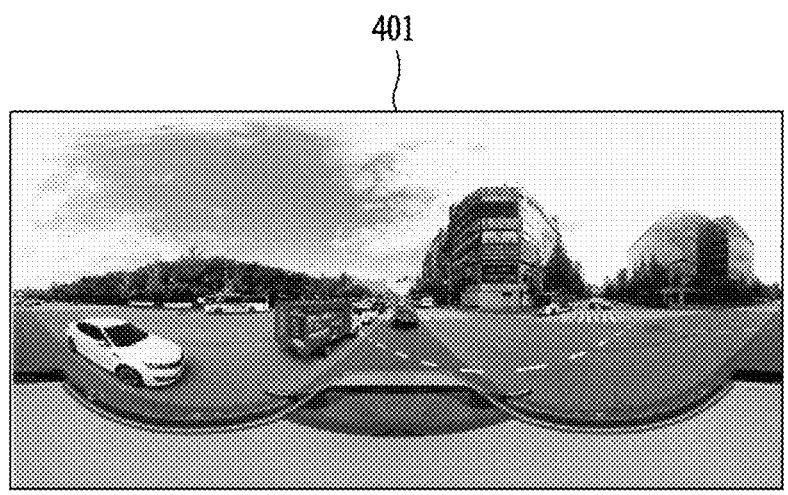
Spherical panoramic image
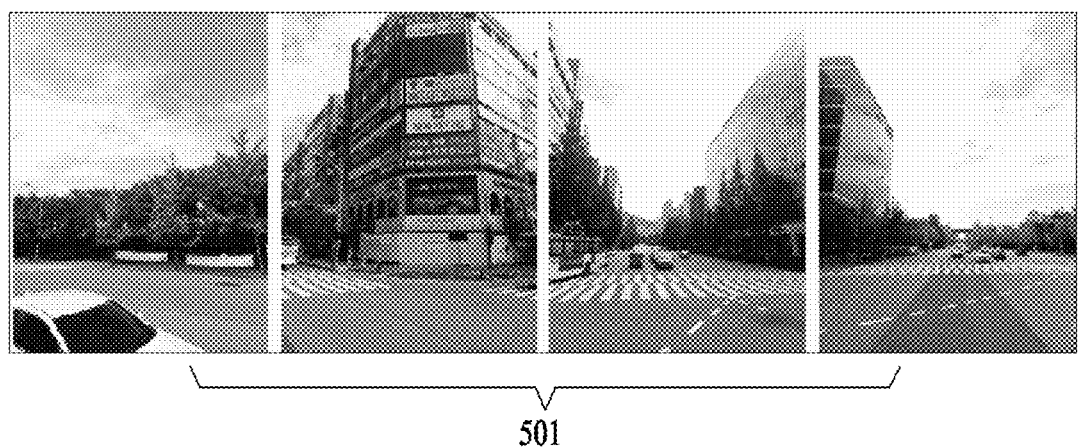

2D map

- - - - - : virtual ray (62)
• : Street view captured location(61)

METHOD AND SYSTEM FOR GENERATING DEPTH INFORMATION OF STREET VIEW IMAGE USING 2D MAP

CROSS-REFERENCE TO RELATED APPLICATION(S)

This U.S. non-provisional application claims the benefit of priority under 35 U.S.C. § 119 to Korean Patent Application No. 10-2019-0098088 filed on Aug. 12, 2019, in the Korean Intellectual Property Office (KIPO), the entire contents of which are incorporated herein by reference.

BACKGROUND OF THE INVENTION

Field of Invention

One or more example embodiments of the following description relate to technology for generating depth information of an image as information for generating a map.

Description of Related Art

Simultaneous localization and mapping (SLAM) technology refers to technology widely used for various types of techniques, such as autonomous driving and drones, and more particularly, to technology for estimating a point of observation using global positioning system (GPS) information, driving distance information, an inertial sensor, etc., and generating a tomographic map based on depth values acquired at the respective points of observation.

In the SLAM technology, acquiring accurate location information on a point of observation and an accurate depth value for each point of observation are importance factors to acquire a precise map.

In general, dedicated equipment including a separate device, for example, an infrared (IR) sensor, an ultrasound sensor, a laser, and an image sensor, is required to acquire information on a point of observation.

As an example of map generation technology, technology for generating a three-dimensional (3D) map by matching a depth value collected using a depth sensor and an image collected using an image sensor is described in Korean Patent Laid-Open Publication No. 10-2018-0053094, published on May 21, 2018.

BRIEF SUMMARY OF THE INVENTION

One or more example embodiments of the present invention provide a method and a system that may generate depth information of a street view image using an open two-dimensional (2D) map.

One or more example embodiments also provide a method and a system that may acquire depth information close to real data on a real map without using separate dedicated equipment for map generation.

According to an aspect of at least one example embodiment, there is provided a depth information generation method implemented by a computer system including at least one processor configured to execute computer-readable instructions included in a memory, the method including, by the at least one processor, calculating distance information of an object on a two-dimensional (2D) map using the 2D map corresponding to a street view image; extracting semantic information on the object from the street view image; and generating depth information of the street view image based on the distance information and the semantic information.

The calculating of the distance information may include calculating a distance from the object based on location information included in the street view image on the 2D map.

The calculating of the distance information may include finding an intersection point with the object by projecting a virtual ray based on location information included in the street view image on the 2D map; and calculating a distance from the location information to the intersection point.

The extracting of the semantic information may include generating an object mask as depth information in a vertical direction by extracting a portion corresponding to the object in the street view image.

The extracting of the semantic information may include extracting the semantic information by classifying each pixel of the street view image into a background and the object through a semantic segmentation scheme.

The generating of the depth information may include generating the depth information of the street view image by inserting, into the object mask, the distance information as depth information in a horizontal direction.

The depth information generation method may further include, by the at least one processor, acquiring the street view image and the 2D map as data open through a map service.

The acquiring of the street view image and the 2D map may include acquiring a 2D map of an area in which the street view image is captured based on location information included in the street view image.

The depth information generation method may further include, by the at least one processor, preprocessing a spherical panoramic image that is the street view image through cropping for each unit angle.

The preprocessing of the spherical panoramic image may include converting the street view image to a spherical coordinate system; and acquiring an image for each unit angle by projecting an image on the spherical coordinate system based on a pin-hole camera model.

According to an aspect of at least one example embodiment, there is provided a non-transitory computer-readable record medium storing computer instructions that, when executed by a processor, cause the processor to perform the depth information generation method.

According to an aspect of at least one example embodiment, there is provided a computer system including at least one processor configured to execute computer-readable instructions included in a memory. The at least one processor includes a distance information calculator configured to calculate distance information of an object on a 2D map using the 2D map corresponding to a street view image; a mask generator configured to generate an object mask that includes semantic information on the object from the street view image; and a depth information generator configured to generate depth information of the street view image based on the distance information and the semantic information.

According to some example embodiments, it is possible to acquire accurate and precise depth information of a street view image using an open 2D map.

Also, according to some embodiments, it is possible to acquire depth information close to real data on a real map without using separate dedicated equipment for map generation.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein:

FIG. 5 illustrates an example of a process of preprocessing a street view image according to an example embodiment;

Figure 1:
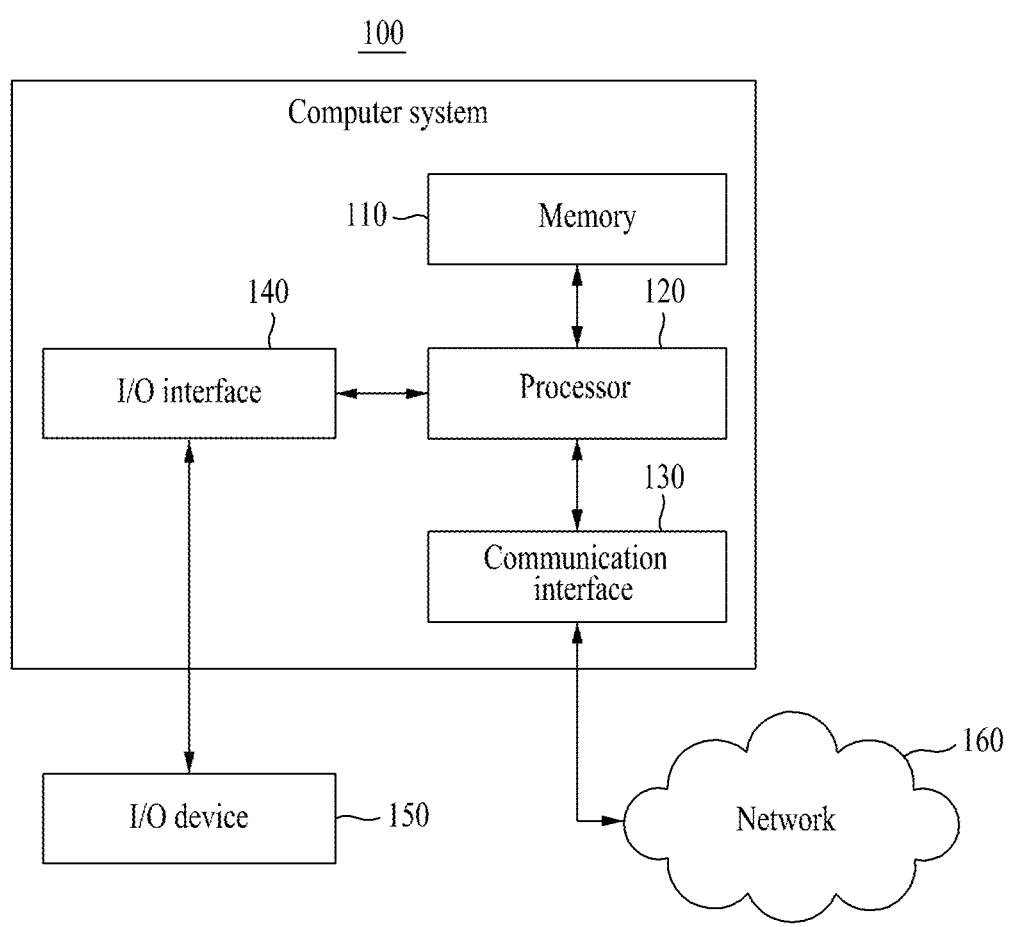
FIG. 1 illustrates an example of a configuration of a computer system according to an example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE INVENTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to technology for acquiring depth information of an image as information for map generation.

The example embodiments including disclosures herein may acquire depth information of a street view image using an open two-dimensional (2D) map and accordingly, may achieve many advantages in terms of simplification, efficiency, accuracy, precision, optimization, speed, and the like, of map generation.

FIG. 1 is a diagram illustrating an example of a computer system according to an example embodiment. For example, a depth information generation system according to example embodiments may be implemented by a computer system 100 of FIG. 1.

Referring to FIG. 1, the computer system 100 may include a memory 110, a processor 120, a communication interface 130, and an input/output (I/O) interface 140 as components to perform a depth information generation method according to example embodiments.

The memory 110 may include a permanent mass storage device, such as a random access memory (RAM), a read only memory (ROM), and a disk drive, as a non-transitory computer-readable storage medium. The permanent mass storage device, such as ROM and a disk drive, may be included in the computer system 100 as a permanent storage device separate from the memory 110. Also, an OS or at least one program code may be stored in the memory 110. Such software components may be loaded to the memory 110 from another non-transitory computer-readable storage medium separate from the memory 110. The other non-transitory computer-readable storage medium may include a non-transitory computer-readable storage medium, for example, a floppy drive, a disk, a tape, a DVD/CD-ROM drive, a memory card, etc. According to other example embodiments, software components may be loaded to the memory 110 through the communication interface 130, instead of, or in addition to, the non-transitory computer-readable storage medium. For example, software components may be loaded to the memory 110 of the computer system 100 based on a computer program installed by files received over a network 160.

The processor 120 may be configured to process computer-readable instructions of a computer program by performing basic arithmetic operations, logic operations, and I/O operations. The computer-readable instructions may be provided from the memory 110 or the communication interface 130 to the processor 120. For example, the processor 120 may be configured to execute received instructions in response to a program code stored in a storage device, such as the memory 110.

The communication interface 130 may provide a function for communication between the computer system 100 and another apparatus over the network 160. For example, the processor 120 of the computer system 100 may transfer a request or an instruction created based on the program code stored in the storage device, such as the memory 110, data, a file, etc., to other devices over the network 160 under control of the communication interface 130. Inversely, a signal, an instruction, data, a file, etc., from another apparatus may be received at the computer system 100 through the communication interface 130 of the computer system 100 by going through the network 160. For example, a signal, an instruction, data, etc., received through the communication interface 130 may be transferred to the processor 120 or the memory 110, and a file, etc., may be stored in a storage medium, for example, the permanent storage device, further includable in the computer system 100.

The communication scheme is not particularly limited and may include a communication method using a near field wired/wireless communication between devices as well as a communication method using a communication network, for example, a mobile communication network, the wired Internet, the wireless Internet, a broadcasting network, etc. For example, the network 160 may include at least one of network topologies that include, for example, a personal area network (PAN), a local area network (LAN), a campus area network (CAN), a metropolitan area network (MAN), a wide area network (WAN), a broadband network (BBN), and the Internet. Also, the network 160 may include at least one of network topologies that include, for example, a bus network, a star network, a ring network, a mesh network, a star-bus network, a tree or hierarchical network, and the like. However, it is only an example and the example embodiments are not limited thereto.

The I/O interface 140 may be a device for interfacing with an I/O device 150. For example, an input device of the I/O device 150 may include a device, such as a microphone, a keyboard, a camera, and a mouse, and an output device of the I/O device 150 may include a device, such as a display and a speaker. As another example, the I/O interface 140 may be a device for interfacing with an apparatus in which an input function and an output function are integrated into a single function, such as a touchscreen. The I/O device 150 may be configured as a single device with the computer system 100.

According to other example embodiments, the computer system 100 may include a number of components greater than or less than the number of components shown in FIG. 1. However, there is no need to clearly illustrate many components known in the related art. For example, the computer system 100 may include at least a portion of the I/O device 150, or may further include other components, for example, a transceiver, a global positioning system (GPS) module, a camera, a variety of sensors, a database (DB), and the like. In detail, for example, the computer system 100 may be configured to further include various components required for map generation, such as an interface module, various types of physical buttons, an I/O port, and the like.

The example embodiments relate to image-based visual localization technology, and more particularly, to technology applicable to an outdoor map.

For image-based visual localization, a three-dimensional (3D) structure of a corresponding area needs to be known. Here, a 3D structure may include 3D coordinates corresponding to a specific pixel of an image and may also include a depth value of the image. That is, knowing the 3D structure may represent knowing 3D coordinates and a depth value of the image.

In general, a 3D structure may be acquired using a red, green, blue (RGB) image through technology, for example, structure from motion (SfM). However, in the case of using only an image, a scale value may not be acquired. Also, a depth value may be merely an estimate value, which may lead to degrading precision.

Although an RGB-D image sensor including a depth sensor is available, the RGB-D image sensor may have a disadvantage in that noise of a depth value is significant. Also, due to the limited depth sensing range, the RGB-D image sensor may not be used to generate an outdoor map.

The example embodiments relate to technology for acquiring a precise depth of a street view image using an open 2D map.

Figure 2:
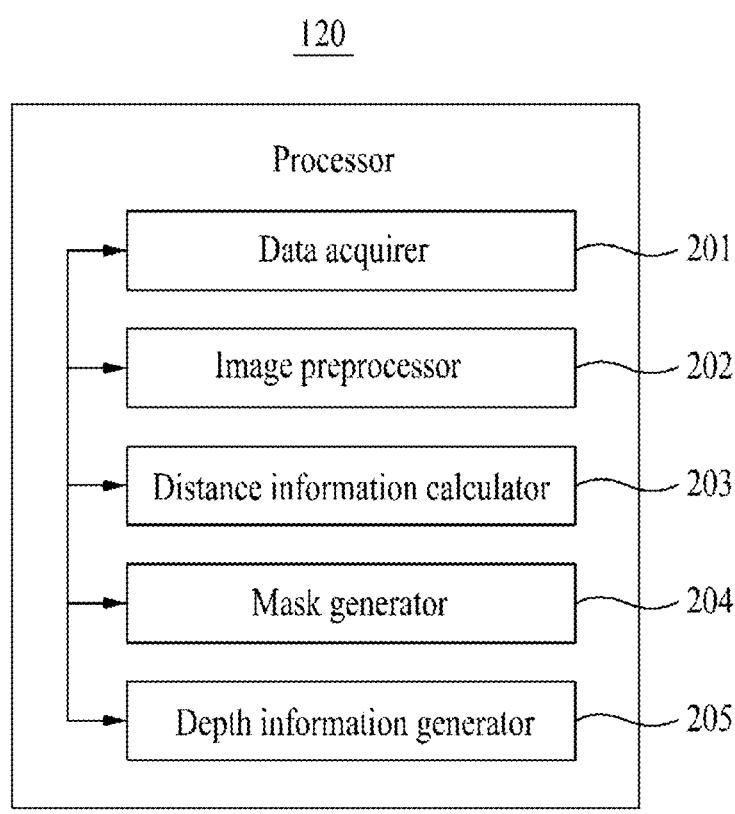
FIG. 2 is a diagram illustrating an example of components includable in a processor of a computer system according to an example embodiment.
Figure 3:
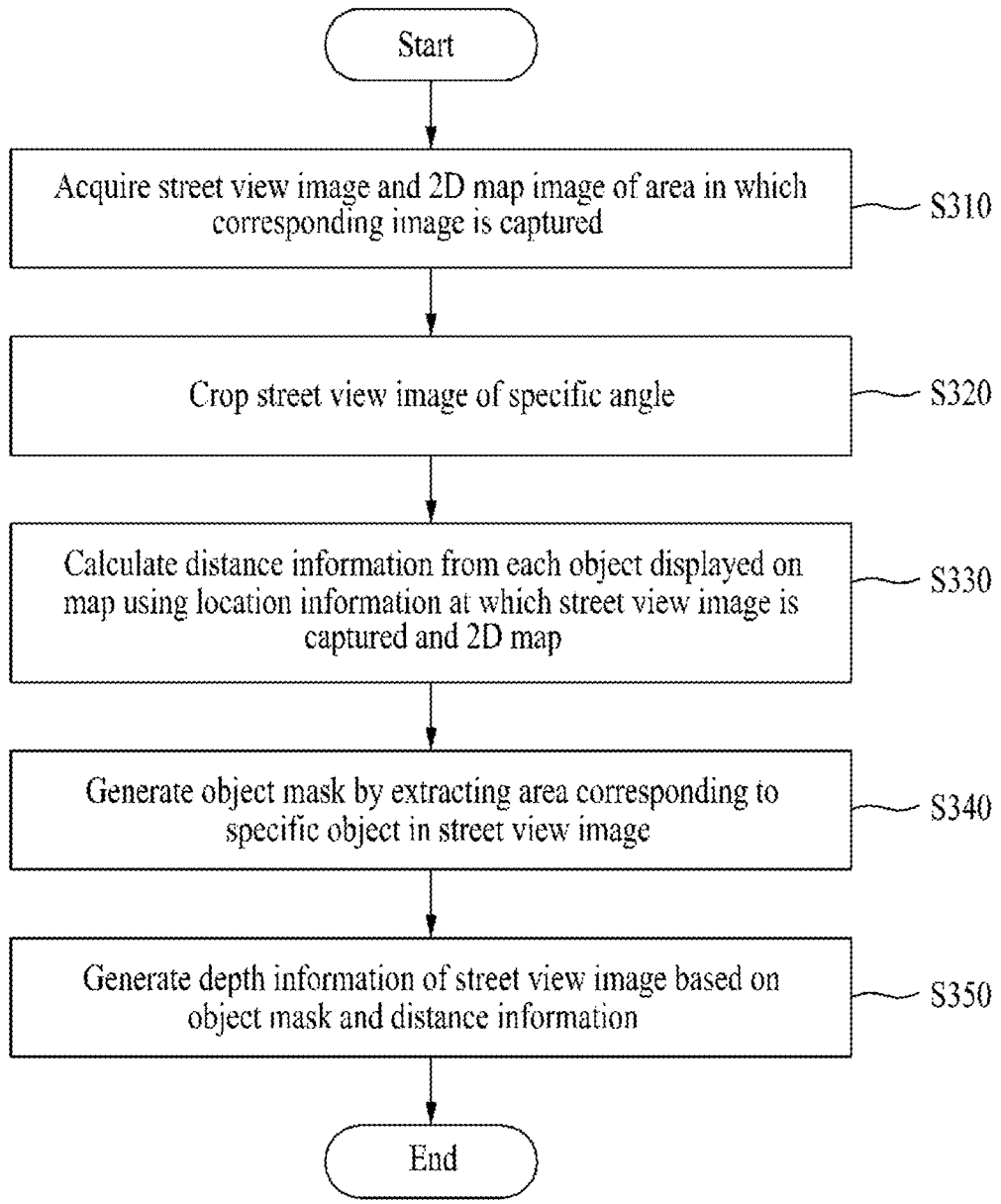
FIG. 3 is a flowchart illustrating an example of a depth information generation method performed by a computer system according to an example embodiment.

FIG. 2 is a diagram illustrating an example of components includable in a processor 120 of the computer system 100 according to an example embodiment, and FIG. 3 is a flowchart illustrating an example of a depth information generation method performed by the computer system 100 according to an example embodiment.

Referring to FIG. 2, the processor 120 may include a data acquirer 201, an image preprocessor 202, a distance information calculator 203, a mask generator 204, and a depth information generator 205.

Such components of the processor 120 may be representations of different functions performed by the processor 120 in response to a control instruction provided according to at least one program code. For example, the data acquirer 201 may be used as a functional representation such that the processor 120 operates to control the computer system 100 to acquire data required to generate depth information of a street view image.

The processor 120 and the components of the processor 120 may perform operations 5310 to 5350 included in the depth information generation method of FIG. 3. For example, the processor 120 and the components of the processor 120 may be configured to execute an instruction according to at least one program code and a code of an OS included in the memory 110. Here, the at least one program code may correspond to a code of a program configured to process the depth information generation method.

The depth information generation method may not be performed in illustrated order. Also, a portion of operations may be omitted from or an additional process may be further included in the depth information generation method.

The processor 120 may load, to the memory 110, a program code stored in a program file for the depth information generation method. For example, the program file for the depth information generation method may be stored in a permanent storage device separate from the memory 110. The processor 120 may control the computer system 100 such that the program code may be loaded from the program file stored in the permanent storage device to the memory 110 through a bus.

Here, the processor 120 and the data acquirer 201, the image preprocessor 202, the distance information calculator 203, the mask generator 204, and the depth information generator 205 included in the processor 120 may be different functional representations of the processor 120 to perform operations 5310 to 5350 by executing a corresponding portion of the program code loaded to the memory 110.

To perform operations 5310 to 5350, the processor 120 and the components of the processor 120 may directly process an operation or control the computer system 100 in response to a control instruction.

Referring to FIG. 3, in operation 5310, the data acquirer 201 may acquire data required to generate depth information of a street view image. For example, the data acquirer 201 may acquire the street view image and a 2D map of an area in which the corresponding image is captured.

Figure 4:
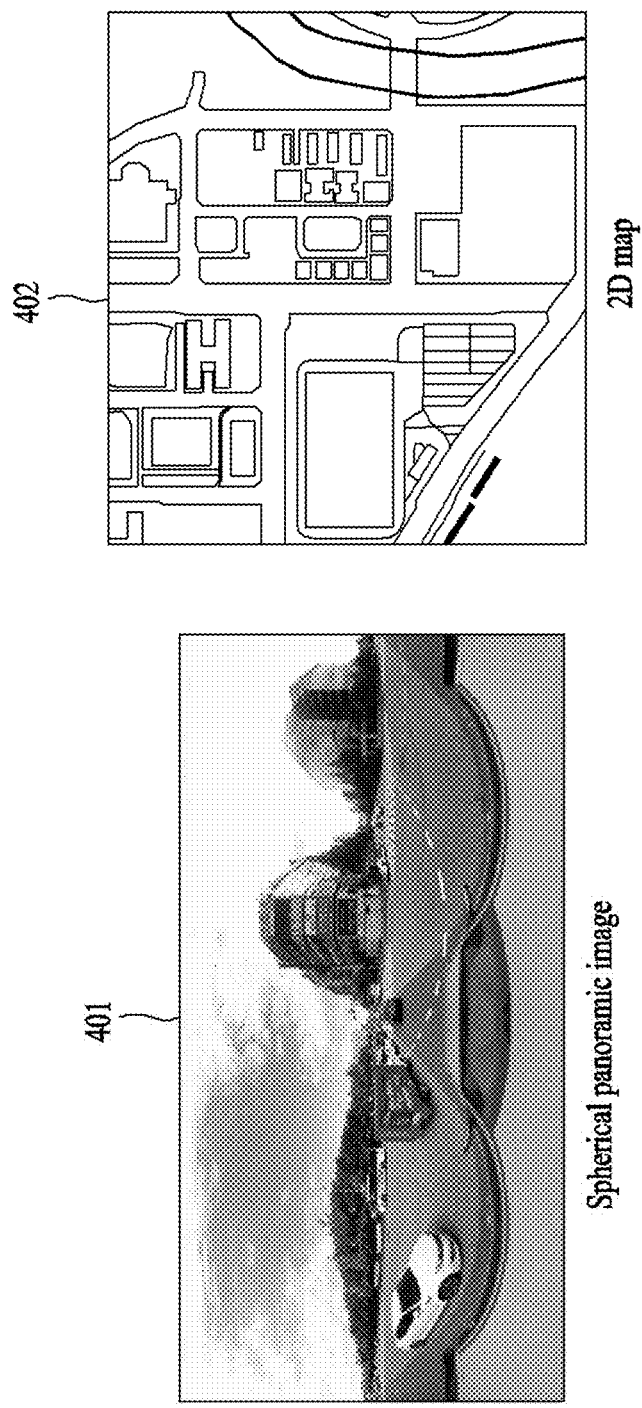
FIG. 4 illustrates an example of a process of acquiring a street view image and a two-dimensional (2D) map according to an example embodiment.

FIG. 4 illustrates an example of a process of acquiring a street view image and a 2D map according to an example embodiment.

Referring to FIG. 4, a street view image 401 refers to a spherical panoramic image captured from a street on a map in 360 degrees. Here, a single point may be viewed in various directions. The street view image 401 may include location information, for example, from a GPS and the like, at which the street view image 401 is captured. The data acquirer 201 may acquire the street view image 401 and a 2D map 402 including an area in which the street view image 401 is captured based on the location information included in the street view image 401. For example, the data acquirer 201 may acquire a 2D map image within a predetermined (or, alternatively, desired) radius based on the location information included in the street view image 401.

The street view image 401 and the 2D map 402 may use map data that is open through an existing map service. The data acquirer 201 may acquire the street view image 401 and the 2D map 402 from a database configured to store and maintain the overall information required to provide a map service. The database may be included in the computer system 100 as a separate permanent storage device distinguished from the memory 110 or may be constructed on a separate computer system interactable with the computer system 100.

Referring again to FIG. 3, in operation 5320, the image preprocessor 202 may preprocess the street view image acquired in operation 5310 in an image form available to generate depth information. The image preprocessor 202 may crop the street view image at a corresponding angle for each unit angle based on a depth information generation application.

For example, the image preprocessor 202 may crop an image of a specific angle that includes a predetermined (or, alternatively, desired) object (hereinafter, a specific object) in the street view image through an image analysis for the street view image. The image preprocessor 202 may crop an image of a specific angle that includes a corresponding object in the street view image through a model having learned a real object image with respect to a specific object type, for example, a building or a major facility, among various objects displayed on a map screen.

FIG. 5 illustrates an example of a process of preprocessing a street view image according to an example embodiment.

Referring to FIG. 5, the image preprocessor 202 may acquire an image 501 preprocessed in a form available to generate depth information by cropping the street view image 401 in a form of a spherical panoramic image at various angles. Here, the image preprocessor 202 may acquire the image 501 of a specific angle through a scheme of converting, to spherical coordinates, the street view image 401, that is, a spherical-panoramically captured 360-degree image to a spherical coordinate system and then projecting the image on the spherical coordinate system based on a pin-hole camera model.

Operation 5320, that is, the aforementioned image preprocessing process may correspond to an optional process that may be omitted depending on example embodiments.

Referring again to FIG. 3, in operation 5330, the distance information calculator 203 may calculate distance information of a specific object displayed on a map using location information included in the street view image (i.e., location information at which the street view image is captured) (hereinafter, referred to as a "street view captured location") and a 2D map of the area in which the corresponding street view image is captured. That is, the distance information calculator 203 may calculate depth information of the street view image in a horizontal direction using the street view captured location and the 2D map.

Figure 6:
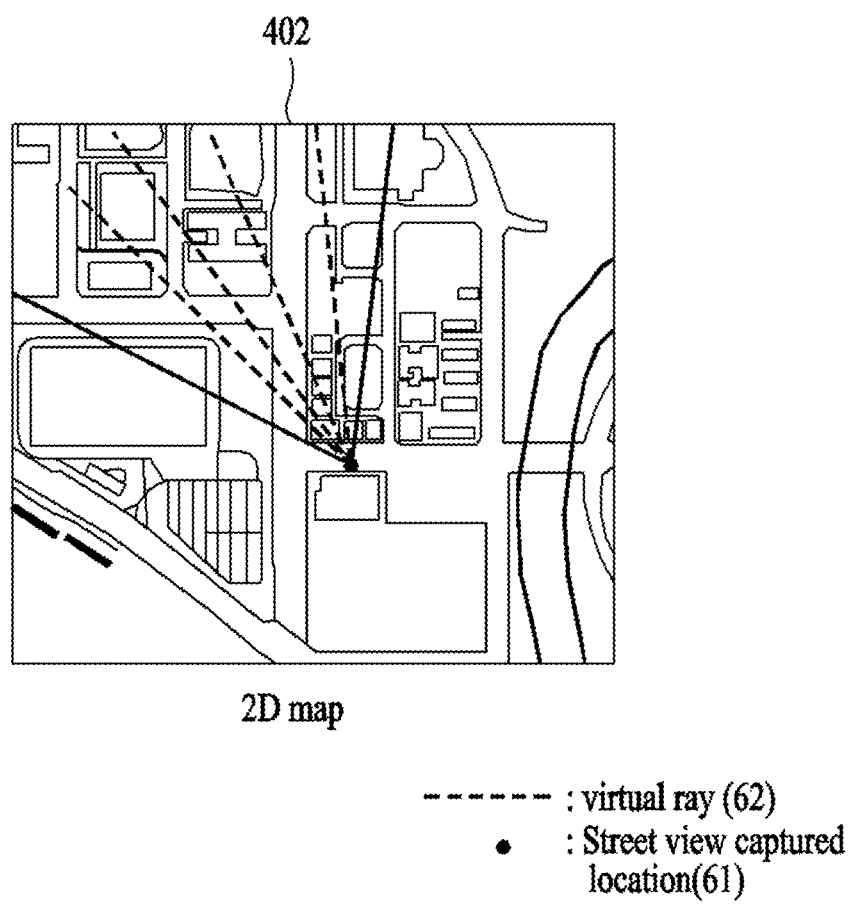
FIGS. 6 to 8 illustrate examples of a process of acquiring depth information in a horizontal direction using a 2D map according to an example embodiment.
Figure 7:
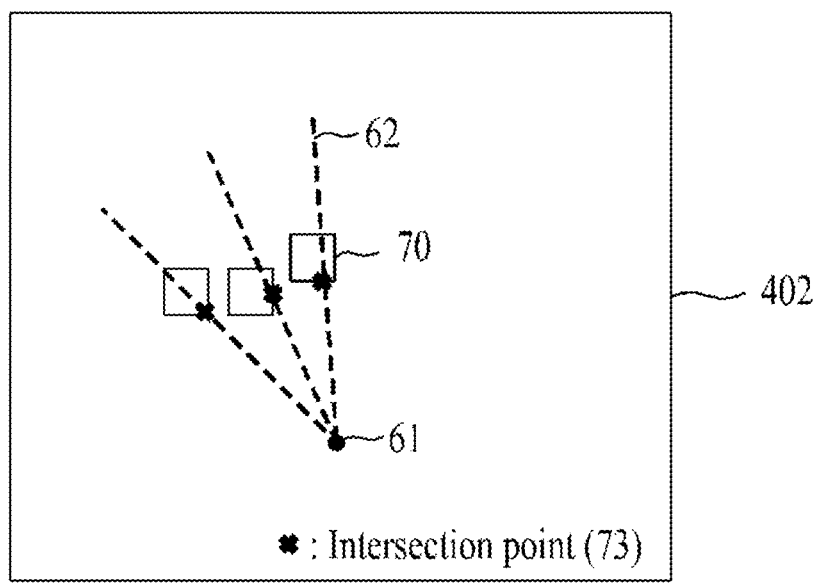
Figure 8:
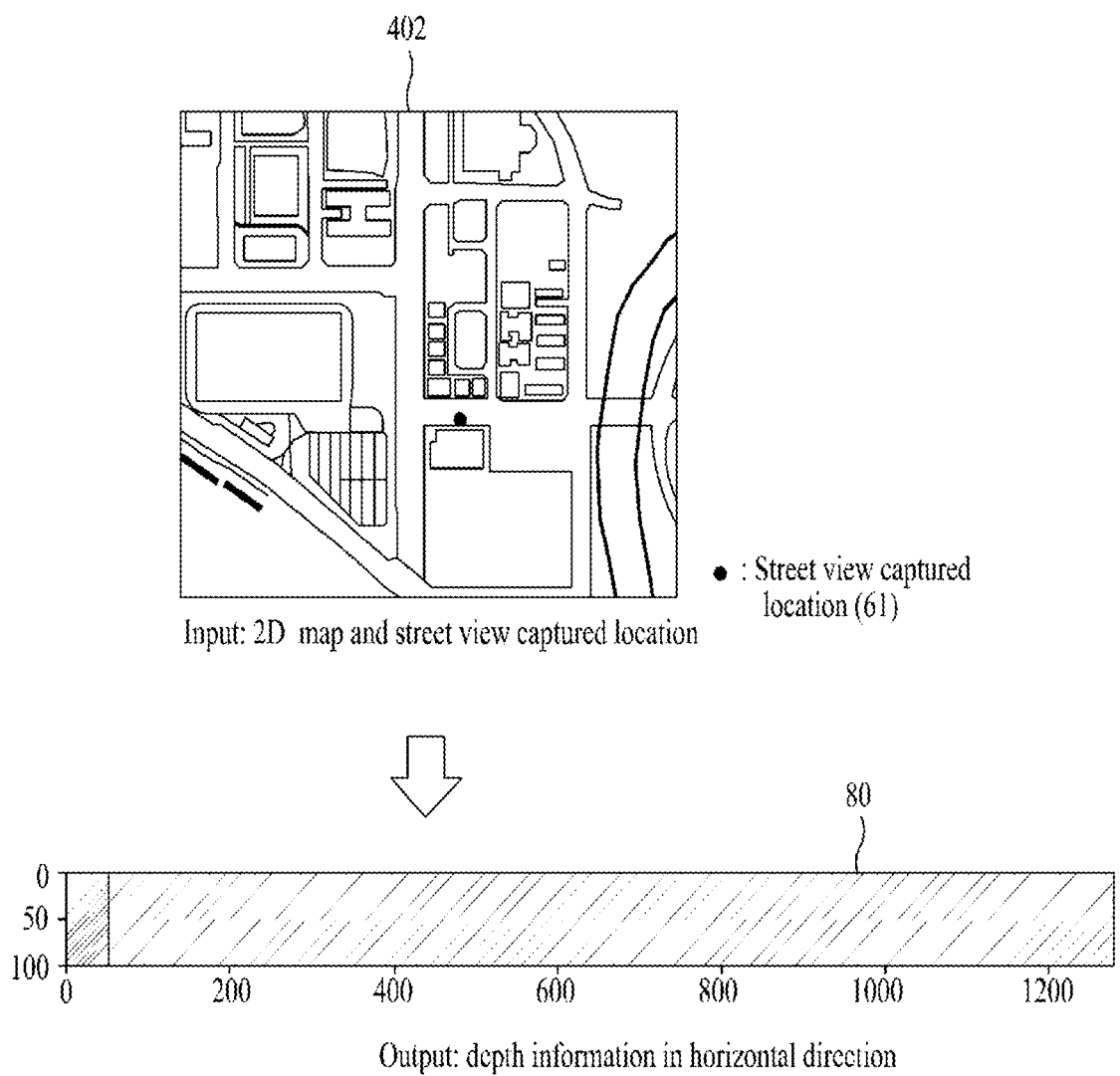

FIGS. 6 to 8 illustrate examples of a process of acquiring depth information in a horizontal direction using a 2D map according to an example embodiment.

Referring to FIG. 6, the distance information calculator 203 may use a virtual ray casting and may calculate a distance from a specific object included in the 2D map 402 using virtual rays 62 based on a street view captured location 61.

In detail, referring to FIG. 7, the distance information calculator 203 may find an intersection point 73 that intersects an outline of a specific object 70, such as a building on the 2D map 402, by projecting the virtual ray 62 based on the street view captured location 61 in the horizontal direction relative to the 2D map 402 in order to scan an object on the 2D map 402. Here, the distance information calculator 203 may find the intersection point 73 that meets the specific object 70 by projecting the virtual ray 62 per a single pixel based on pixel information of a map image. The distance information calculator 203 may calculate distance information from each object by calculating a distance between the street view captured location 61 and the intersection point 73.

For example, referring to FIG. 8, the distance information calculator 203 may acquire depth information 80 in the horizontal direction based on pixel information by calculating a distance from a specific object displayed on the 2D map 402 using the 2D map 402 and the street view captured location 61.

Referring again to FIG. 3, in operation 5340, the mask generator 204 may generate an object mask by extracting an area corresponding to the specific object in the street view image preprocessed in operation 5320.

Figure 9:
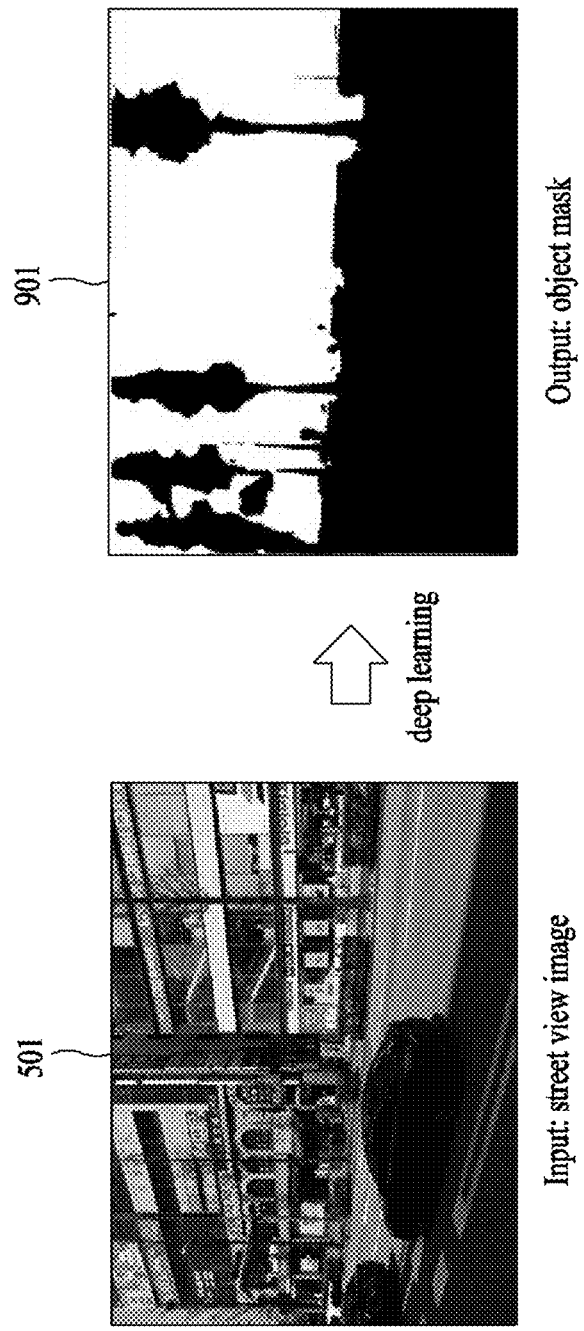
FIG. 9 illustrates an example of a process of acquiring depth information in a vertical direction using a street view image according to an example embodiment.

FIG. 9 illustrates an example of a process of acquiring depth information in a vertical direction using a street view image according to an example embodiment.

For example, the mask generator 204 may apply a deep learning-based semantic segmentation scheme to generate an object mask that represents depth information of the street view image in a vertical direction.

Referring to FIG. 9, the mask generator 204 may generate an object mask 901 by extracting only a portion corresponding to a specific object, such as a building, in a street view image 501 through the semantic segmentation scheme. The semantic segmentation scheme relates to classifying each pixel of an image, that is, classifying each pixel constituting the image into a background and an object through a learning model, such as a convolution neural network (CNN).

Referring again to FIG. 3, in operation 5350, the depth information generator 205 may generate depth information of the entire street view image based on the distance information calculated in operation 5330 and the object mask generated in operation 5340.

Figure 10:
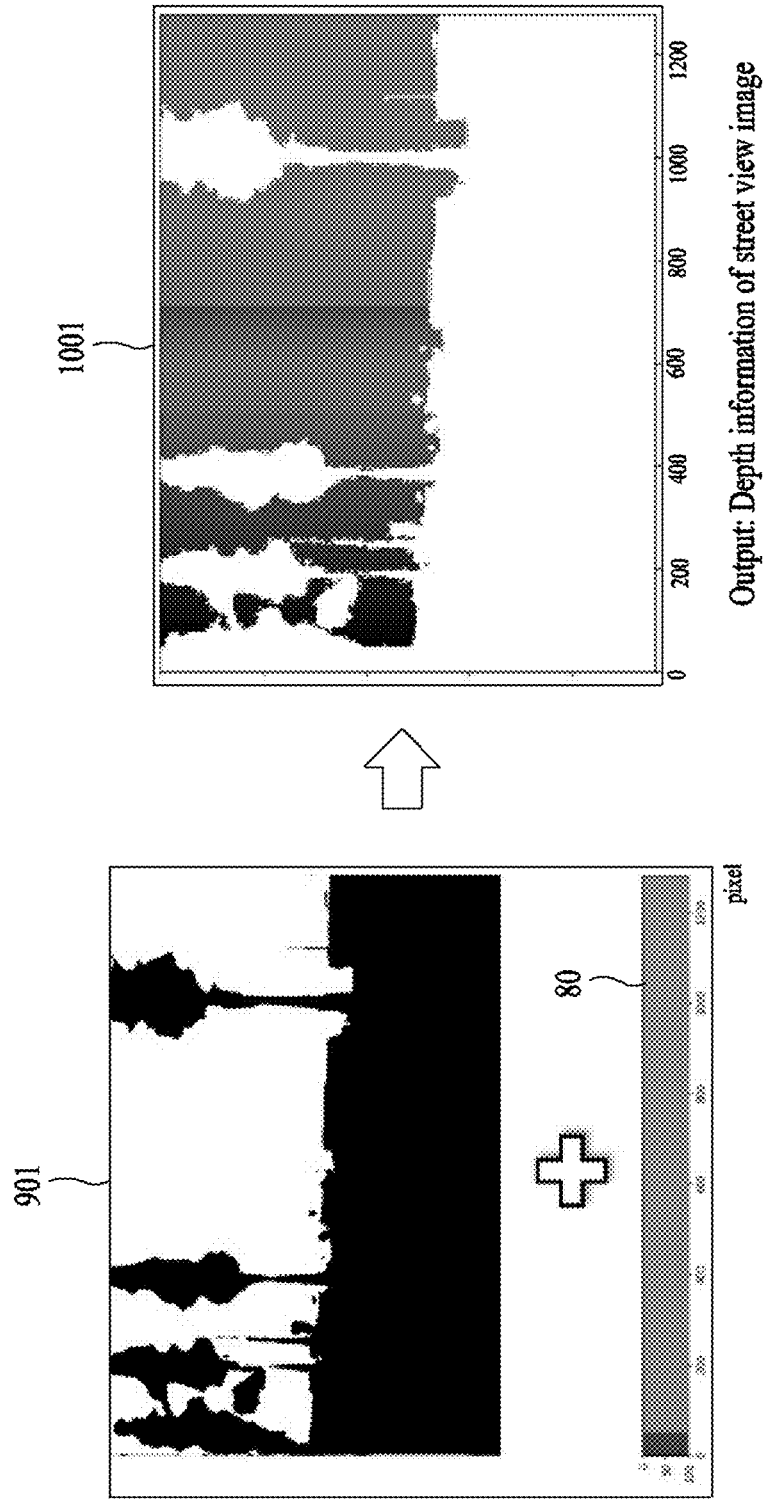
FIG. 10 illustrates an example of a process of acquiring final depth information of a street view image according to an example embodiment.

FIG. 10 illustrates an example of a process of acquiring final depth information of a street view image according to an example embodiment.

Referring to FIG. 10, the depth information generator 205 may acquire depth information 1001 of the entire image by inserting distance information, that is, the depth information 80 in the horizontal direction, acquired from a 2D map into a portion corresponding to a specific object of the object mask 901 generated as depth information in the vertical direction. That is, the depth information generator 205 may generate final depth information of the street view image by applying the depth information of the street view image in the horizontal direction to the depth information of the street view image in the vertical direction. The final depth information of the street view image may then be provided to and used by a three-dimensional (3D) map generating system to create 3D road or street maps or other types of maps that are presented in three dimensions.

According to example embodiments, accurate depth information of a street view image may be acquired using a 2D image of an area in which the street view image is captured as an open map, i.e., a 2D map open through a map service.

As described above, according to some example embodiments, it is possible to acquire accurate and precise depth information of a street view image using an open 2D map.

Also, according to some embodiments, it is possible to acquire depth information close to real data, i.e., actual measurement values, on a real or open map without using separate dedicated equipment for map generation. Also, according to example embodiments, since it is possible to acquire depth information of a street view image based on semantic information of an image and an open 2D map, it is possible to achieve a significantly fast processing rate compared to SfM, and to be more suitable for outdoor map generation due to its wide depth sensing range compared to using an image sensor.

The systems and/or apparatuses described herein may be implemented using hardware components, software components, and/or a combination thereof. For example, a hardware component such as a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as flopticaldisks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing description has been provided for purposes of illustration and description. It is not intended to be exhaustive or to limit the disclosure. Individual elements or features of a particular example embodiment are generally not limited to that particular embodiment but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A depth information generation method implemented by a computer system having at least one processor configured to execute computer-readable instructions included in a memory, the method comprising:
    acquiring an existing two-dimensional (2D) street map displaying an area around an object included in a street view image;
    calculating distance information of the object on the 2D street map using the 2D street map;
    extracting semantic information on the object from the street view image; and
    generating depth information of the street view image based on the distance information and the semantic information.

2. The method of claim 1, wherein the distance information is calculated based on location information on the 2D street map included in the street view.

3. The method of claim 1, wherein the calculating of the distance information comprises:
    finding an intersection point with the object by projecting a virtual ray based on location information on the 2D street map included in the street view; and
    calculating a distance from the location information to the intersection point.

4. The method of claim 1, wherein the extracting of the semantic information comprises generating an object mask as depth information in a vertical direction by extracting a portion corresponding to the object in the street view image.

5. The method of claim 1, wherein the extracting of the semantic information comprises extracting the semantic information by classifying each pixel of the street view image into a background and the object through a semantic segmentation scheme.

6. The method of claim 4, wherein the generating of the object mask comprises generating the depth information of the street view image by inserting, into the object mask, the distance information as depth information in a horizontal direction.

7. The method of claim 1,
    wherein the street view image and the 2D street map are acquired as data open through a map service.

8. The method of claim 7, wherein the 2D street map is acquired of an area in which the street view image is captured based on location information included in the street view image.

9. The method of claim 1, further comprising:
    preprocessing a spherical panoramic image that is the street view image, through cropping for each unit angle.

10. The method of claim 9, wherein the preprocessing comprises:
    converting the street view image to a spherical coordinate system; and
    acquiring an image for each unit angle by projecting an image on the spherical coordinate system based on a pin-hole camera model.

11. A non-transitory computer-readable record medium storing computer instructions that, when executed by a processor, cause the processor to perform the depth information generation method comprising:
    acquiring an existing two-dimensional (2D) street map displaying an area around an object included in a street view image;
    calculating distance information of the object on the 2D street map using the 2D street map;
    extracting semantic information on the object from the street view image; and
    generating depth information of the street view image based on the distance information and the semantic information.

12. A computer system comprising:
    at least one processor configured to execute computer-readable instructions included in a memory,
    wherein the at least one processor comprises:
    data acquirer configured to acquire an existing two-dimensional (2D) street map displaying an area around an object included in a street view image;
    a distance information calculator configured to calculate distance information of the object on the 2D street map using the 2D street map;
    a mask generator configured to generate an object mask that includes semantic information on the object from the street view image; and
    a depth information generator configured to generate depth information of the street view image based on the distance information and the semantic information.

13. The computer system of claim 12, wherein the distance information is calculated based on location information on the 2D street map included in the street view image.

14. The computer system of claim 12, wherein the distance information calculator is further configured to find an intersection point with the object by projecting a virtual ray based on location information on the 2D street map included in the street view image, and to calculate a distance from the location information to the intersection point.

15. The computer system of claim 12, wherein the mask generator is further configured to generate the object mask as depth information in a vertical direction by extracting a portion corresponding to the object in the street view image.

16. The computer system of claim 12, wherein the mask generator is further configured to extract the semantic information by classifying each pixel of the street view image into a background and the object through a semantic segmentation scheme.

17. The computer system of claim 12, wherein the depth information generator is further configured to generate the depth information of the street view image by inserting, into the object mask, the distance information as depth information in a horizontal direction.

18. The computer system of claim 12, wherein the street view image and the 2D street map are acquired as data open through a map service, and
    the 2D street map is acquired of an area in which the street view image is captured based on location information included in the street view image.

19. The computer system of claim 12, wherein the at least one processor further comprises an image preprocessor configured to preprocess a spherical panoramic image that is the street view image, through cropping for each unit angle.

20. The computer system of claim 19, wherein the image preprocessor is further configured to convert the street view image to a spherical coordinate system, and to acquire an image for each unit angle by projecting an image on the spherical coordinate system based on a pin-hole camera model.

* * * * *